United States Patent
Steiner et al.

(10) Patent No.: US 9,226,260 B2
(45) Date of Patent: Dec. 29, 2015

(54) INITIATOR-CONDITIONED FINE TIMING MEASUREMENT SERVICE REQUEST

(71) Applicants: Itai Steiner, Petach Tikva (IL); Jonathan Segev, Tel Mond (IL)

(72) Inventors: Itai Steiner, Petach Tikva (IL); Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 13/891,973

(22) Filed: May 10, 2013

(65) Prior Publication Data
US 2014/0335885 A1    Nov. 13, 2014

(51) Int. Cl.
H04W 24/00 (2009.01)
H04W 64/00 (2009.01)

(52) U.S. Cl.
CPC .................................... *H04W 64/00* (2013.01)

(58) Field of Classification Search
USPC ............... 455/456.1, 438; 370/252, 350, 329
See application file for complete search history.

(56) References Cited

U.S. PATENT DOCUMENTS

| | | | |
|---|---|---|---|
| 2002/0118723 A1* | 8/2002 | McCrady et al. | 375/130 |
| 2005/0058081 A1* | 3/2005 | Elliott | 370/252 |
| 2006/0246904 A1* | 11/2006 | Olvera-Hernandez et al. | 455/438 |
| 2007/0004430 A1* | 1/2007 | Hyun et al. | 455/456.1 |
| 2009/0257426 A1* | 10/2009 | Hart et al. | 370/350 |
| 2010/0046388 A1* | 2/2010 | Kim et al. | 370/252 |
| 2010/0151886 A1* | 6/2010 | Swope et al. | 455/456.5 |
| 2013/0142143 A1* | 6/2013 | Yan et al. | 370/329 |
| 2013/0336131 A1* | 12/2013 | Zhang et al. | 370/252 |
| 2014/0073352 A1* | 3/2014 | Aldana et al. | 455/456.1 |
| 2014/0160959 A1* | 6/2014 | Aldana et al. | 370/252 |

FOREIGN PATENT DOCUMENTS

| | | |
|---|---|---|
| EP | 18604551 | 8/2002 |
| WO | WO-2014182800 A1 | 11/2014 |

OTHER PUBLICATIONS

"International Application Serial No. PCT/US2014/037129, International Search Report mailed Sep. 17, 2014", 4 pgs.
"International Application Serial No. PCT/US2014/037129, Written Opinion mailed Sep. 17, 2014", 9 pgs.

* cited by examiner

*Primary Examiner* — Nathan Taylor
(74) *Attorney, Agent, or Firm* — Schwegman Lundberg & Woessner, P.A.

(57) ABSTRACT

Embodiments for providing initiator-conditioned fine timing measurement service request are generally described herein. In some embodiments, a range management module is arranged to initiate transmission of a fine timing measurement request message for determining a timing measurement to a responding device. Timing measurement information is received in response to the transmission of the fine timing measurement request message. The timing measurement information is received according to the condition instructions provided in the fine timing measurement request message. A timing measurement is calculated based on the timing of receiving the timing measurement information.

27 Claims, 8 Drawing Sheets

INITIATOR-CONDITIONED FINE TIMING MEASUREMENT SERVICE REQUEST

BACKGROUND

The proliferation of wireless devices in the recent past has been exceptional and includes communication and computing devices that are able to exchange data or voice signals amongst each other and/or with a central location. These devices communicate typically through radio waves over dedicated frequencies or dedicated segments of the electromagnetic spectrum. The range of these radio communications varies. For example, repeaters, cellular towers, or other nodes of the device's network may be used to extend that range. One example of these devices may be cellular telephones; however, other examples could include devices having multiple functions, such as portable or hand held computers with wireless capabilities, devices with e-mail sending and receiving capabilities, pagers, or two way radio communication devices.

The ability to estimate the relative distance between wireless nodes is becoming of upmost importance for a number of wireless device applications that require location awareness. Location awareness is also becoming important for asset tracking. As such, the need for Wi-Fi devices to provide location or positioning information is increasing For example, the United States Federal Communications Commission's E911 telecommunication initiatives require that wireless phone providers develop a way to locate any phone that makes a 911 emergency call. Location techniques will also be used for many future wireless systems and devices.

To support location services, a mobile station (STA) may negotiate with an access point (AP). The STA may send a request to the AP and the AP may respond with information enabling the STA to perform fine timing measurements. Wi-Fi based positioning system (WPS) is used where GPS is inadequate as in multipath and signal blockage indoors, among other things. An access point, which may be a Wi-Fi or WiMAX capable device, may exchange ranging signals with other access points or network devices. Ranging signals typically identify the transmitting device by a network address or other identifier and can be used to measure the time of flight between two wireless devices. Fine timing measurements may then be used to determine a round-trip time for signals exchanged by a pair of wireless devices. However, neither the STA nor the AP set conditions and/or preferences for the establishment of the fine timing measurement service.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To support location services, a mobile station (STA) negotiates with an access point (AP). The STA sends a request to the AP and the AP responds with information enabling the STA to determine the timing measurement. However, the current process does not provide for the STA and the AP setting conditions and/or preferences for the establishment of the Fine-Time measurement service.

Accordingly, the service initiator has the ability to request a timing measurement or fine timing measurement from its counterpart, but the service initiator is unable to set any condition for the establishment of the service. This is especially important when large numbers of APs are able to decode and respond to the message (as is the case for broadcast and multicast service request). However not all APs may be equipped for this purpose. For example, some APs might be with poor Line-of-Sight (LOS) conditions. e.g., poor group delay, but with good carrier to interference-plus-noise ratio (CINR)/signal to noise ratio (SNR)/energy per bit to noise power spectral density ratio (Eb/NO) or similar decoding related link conditions parameters). In addition, the AP might not have information pertaining to how critical it is to accept the service request by the STA to enable it to calculate its location from the multiple distance measurements to multiple APs.

Herein, references to STA and AP are made to designate the former as a service initiator and the latter as a service provider. However, those skilled in the art will recognize that the STA and AP can switch roles in some embodiments. Additionally, the service initiator and service provider may be non-AP STAs. Further, the STA and the AP may be referred to as the initiator, initiating device, responder or responding device, depending on the situation.

Figure 1:
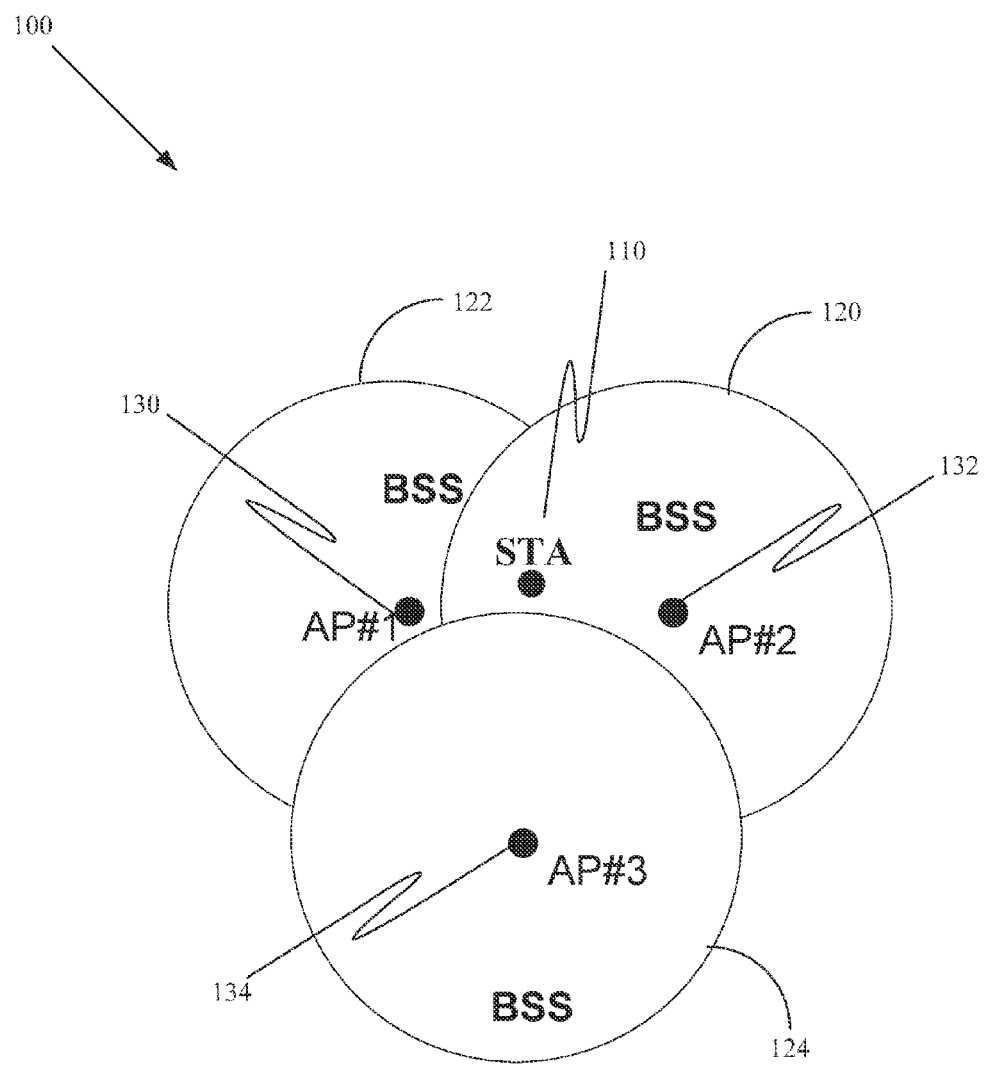
FIG. 1 illustrates a wireless system according to an embodiment.

FIG. 1 illustrates a wireless system 100, according to an embodiment. In FIG. 1, a station 110 is located within the coverage area of an access point #2 (AP#2) 132. Three basic service sets (BSS) 120, 122, 124 are defined. A BSS is the basic building block of an 802.11 wireless local area network (LAN). In infrastructure mode, an AP together with associated stations (STAs) is called an infrastructure BSS. The station 110 may request a location measurement process to be initiated by an AP (e.g., AP#1 130, AP#3 134).

Estimations of the distance between two devices may be accomplished using fine timing measurements. Precise time measurement may be used to calculate, using additional information such as AP location, accurate location estimation compared to the location estimation obtained from signal strength alone. The Institute of Electrical and Electronic Engineers (IEEE) 802.11 family of standards governs wireless networking transmission. The IEEE 802.11 standard defines a frame exchange from which ToF can be determined. More specifically, ToF may be used to measure the distance between a station and APs by directly performing fine timing measurements through a frame exchange sequence between a pair of devices. However, the frame exchange now defined by the IEEE 802.11 standard uses a large number of frames during an exchange to perform ToF measurements.

Figure 2:
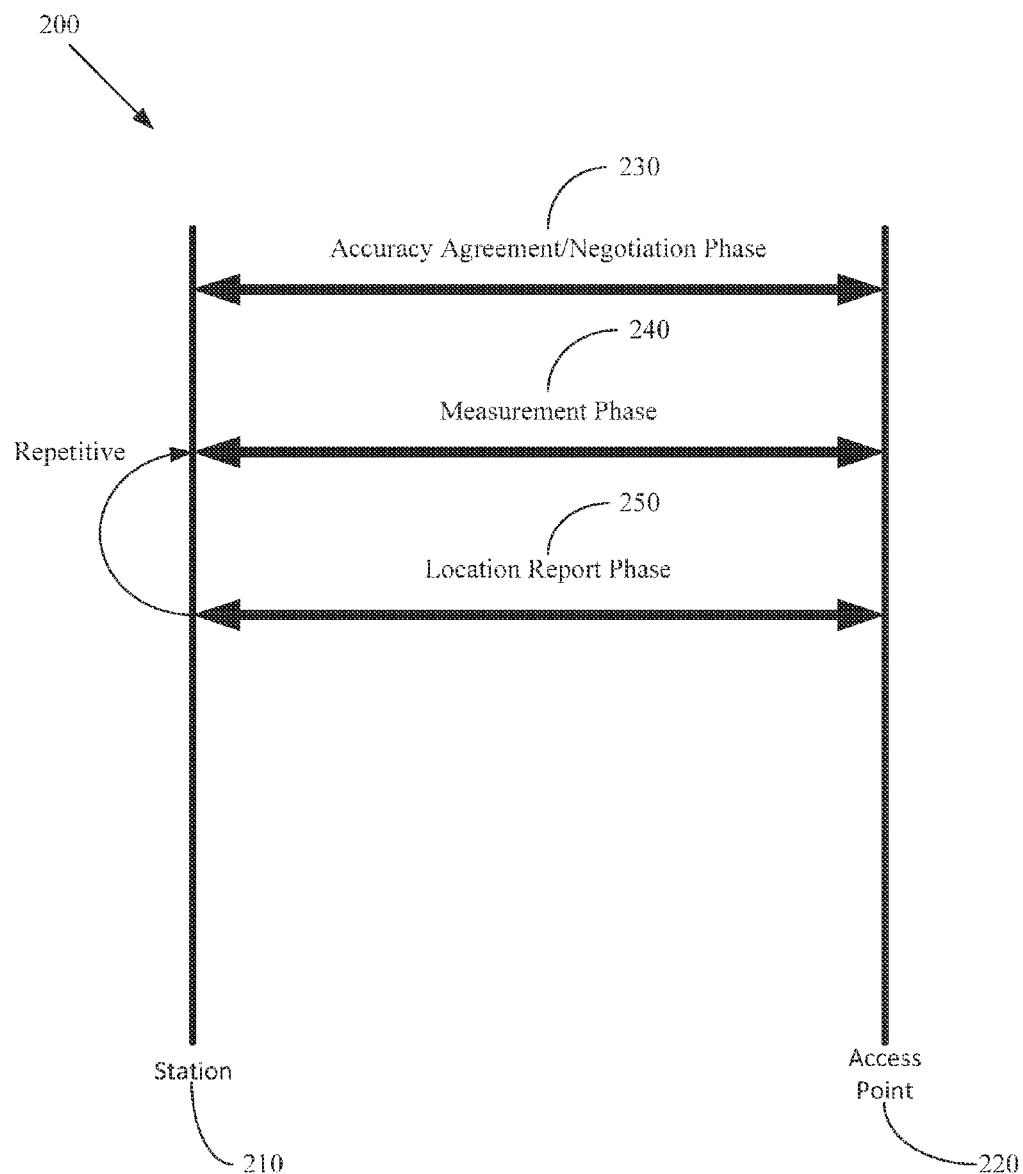
FIG. 2 shows a frame exchange for Wi-Fi ToF measurements according to an embodiment.

FIG. 2 shows a frame exchange 200 for ToF measurements, according to an embodiment. In FIG. 2, the frame exchange 200 involves a fine timing measurement service request sequence that is carried out between an STA 210 and an AP 220. The STA 210 and the AP 220 perform an accuracy agreement and/or negotiation phase 230. A measurement phase 240 is executed. A location report phase 250 is executed. The measurement phase 240 and the location report phase 250 may be repeated. Thus, the service initiator (e.g., the STA 210) may request or negotiate the establishment of a service during the accuracy agreement and or negotiation phase 230.

Figure 3:
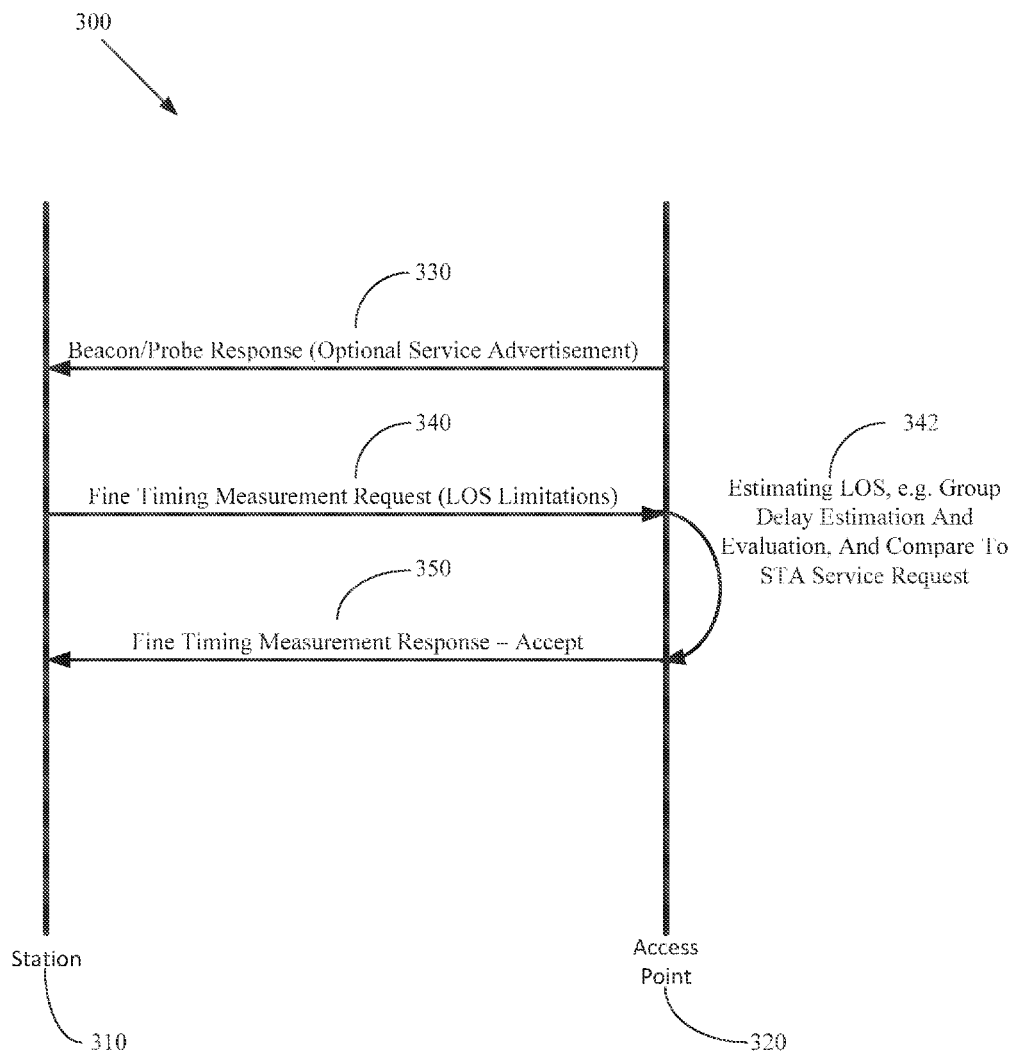
FIG. 3 illustrates a LOS estimation process based on the channel group delay estimation as perceived by the AP according to an embodiment.

FIG. 3 illustrates an LOS estimation process 300 based on the channel group delay estimation as perceived by the AP, according to an embodiment. The LOS estimation process 300 provides a good measure of the accuracy level that may obtained by the fine timing measurement procedure when channel reciprocity is implemented.

In FIG. 3, the AP 320 sends a beacon/probe response (optional service advertisement) 330 to the STA 310. The STA 310 sends a fine timing measurement request (LOS limitations) 340 to the AP 320. The AP 320 estimates LOS 342 (e.g. group delay estimation and evaluation, and compares the result to the STA service request). The AP 320 then provides a fine timing measurement response 350, an accept message, to the STA 320 based on the group delay/STA service request message. Thus, the LOS estimation process 300 merges the 1st phase (i.e., the accuracy agreement and/or negotiation 230 of FIG. 1) to the first part of the 2nd phase (i.e., the measurement phase 240 of FIG. 1). In other words, the fine timing measurement request 340 is used by the AP 320 to provide a fine timing measurement response 350 to the STA 310.

Figure 4:
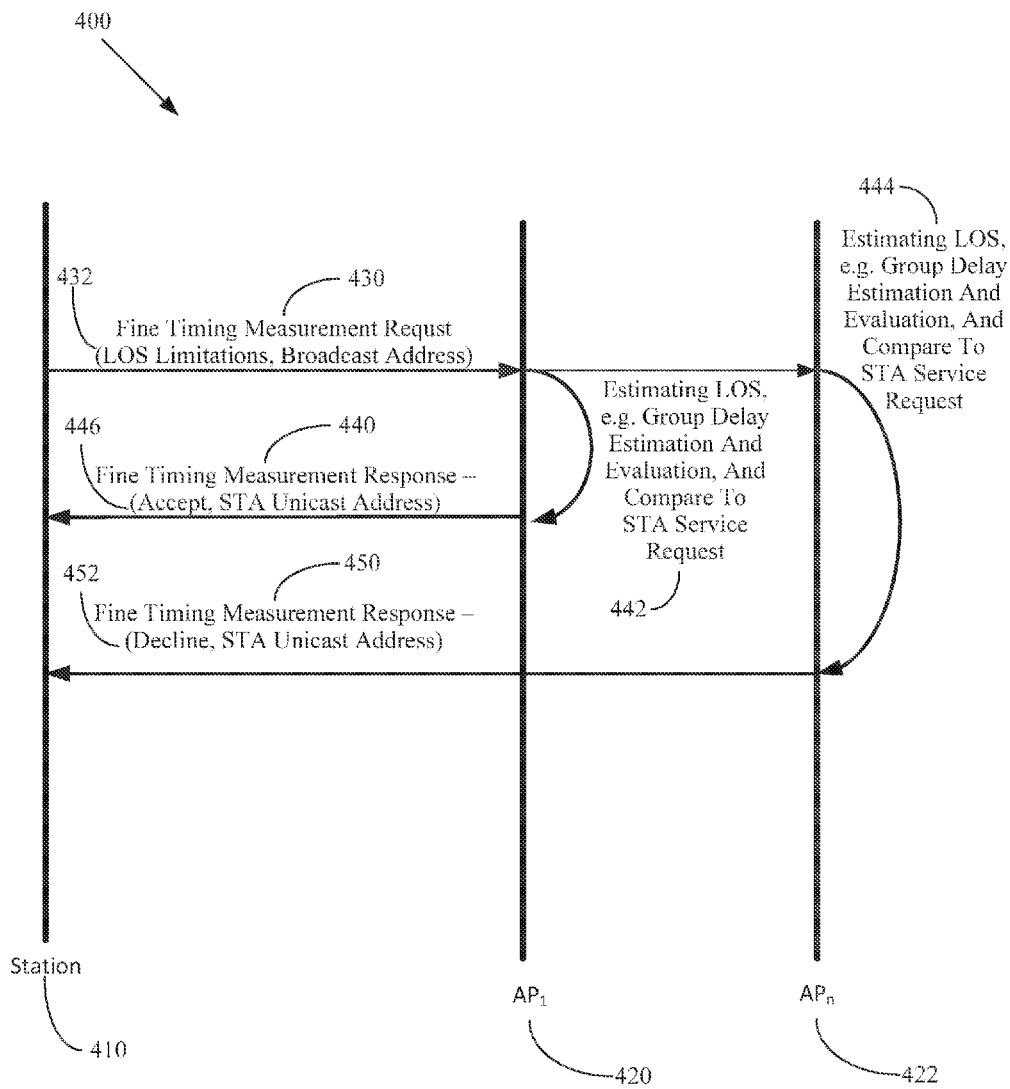
FIG. 4 illustrates a conditioned response for broadcast services according to an embodiment.

FIG. 4 illustrates a conditioned response 400 for broadcast services, according to an embodiment. In FIG. 4, an STA 410 broadcasts a fine timing measurement request 430. The fine timing measurement request 430 includes trigger conditions 432 for a broadcast request of fine timing measurement where multiple APs (e.g., AP1 420, APn 422) might respond to a single fine timing request 430. By having the STA 410 include the trigger condition 432, a subset of the APs (e.g., AP1 420) may respond. Thus, adequate APs will respond. However, APs that may have poor Line-of-Sight (LOS) conditions may not respond. Thus, the overall system capacity is increased.

After the STA 410 has broadcast the fine timing measurement request 430 with the trigger conditions 432, the APs (e.g., AP1 420, APn 422) estimate LOS 442, 444 (e.g. group delay estimation and evaluation, and compares the result to the STA service request 430). APs, which have adequate conditions for responding to the request 430, send a fine timing measurement response 440-accept a message that includes an indication 446 that the response 440 to the requesting STA 410 is a unicast message from AP1 420. APn 422 may also determine that it does not have adequate conditions for responding to the request 430 and, thus, sends a fine timing measurement response 450, a decline message, that includes an indication 452 that the response to the requesting STA 410 is declined and that the response 450 is a unicast message from APn 422.

Figure 5:
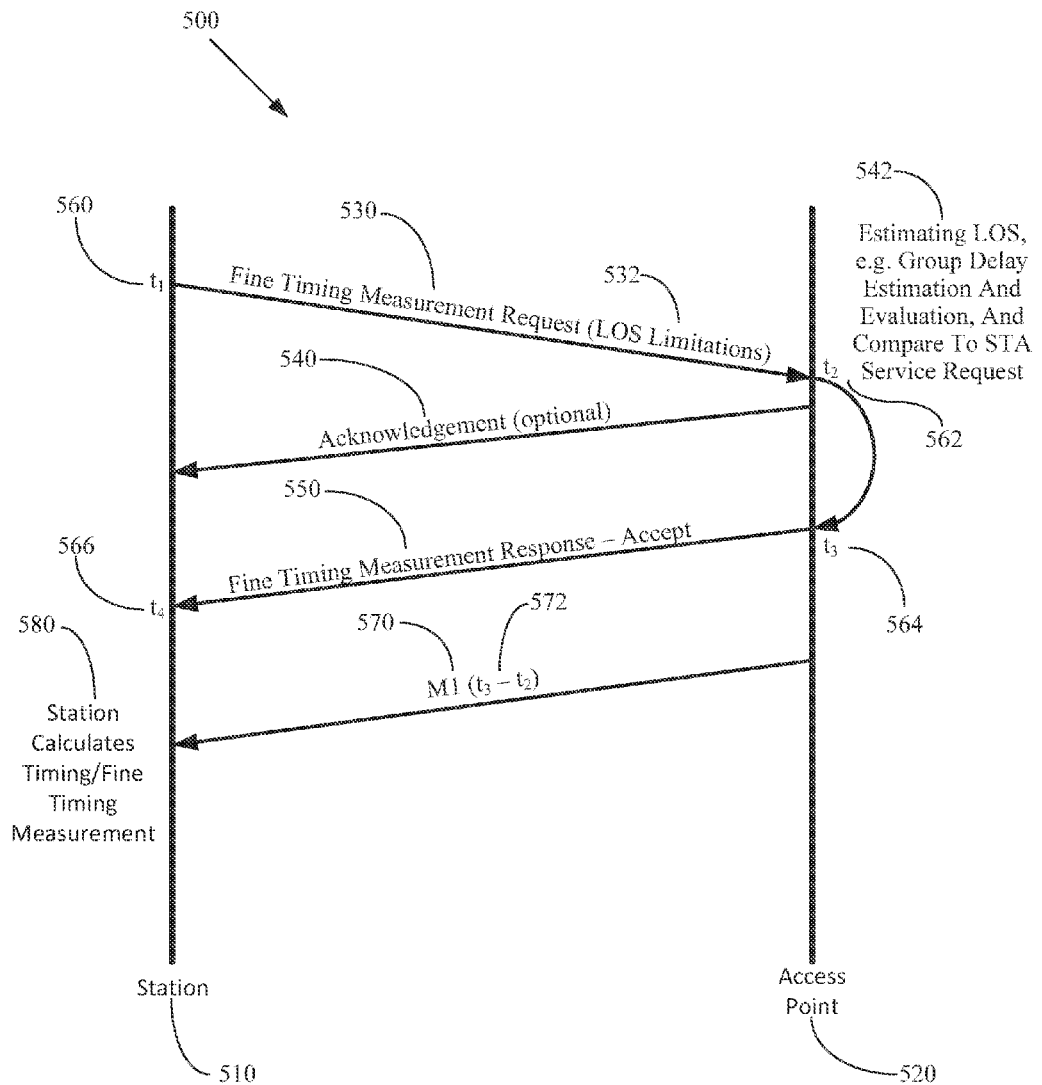
FIG. 5 illustrates a merged conditioned response for broadcast services according to an embodiment.

FIG. 5 illustrates a merged conditioned response 500 for broadcast services, according to an embodiment. In FIG. 5, an STA 510 sends a fine timing measurement request 530. The fine timing measurement request 530 includes start conditions 532. The STA 510 notes the time the fine timing measurement request 530 was sent to the AP 520 as t1 560. The AP 520 records the time of the arrival of the fine timing measurement request 530 as t2 562. The AP 520 sends an acknowledgement 540 to STA 510. The AP 520 estimates LOS 542 (e.g. group delay estimation and evaluation, and compares the result to the STA service request).

The AP 520 then sends a fine timing measurement response 550, an accept message, to the STA 510. The AP 520 notes the time the fine timing measurement response 550, the accept message, was sent to the STA 510 as t3 564. The STA 510 notes the time of arrival of the fine timing measurement response 550, the accept message, as t4 566. The AP 520 then sends location information message 570, which includes location information 572 such as t3 564 and t2 562 or the difference between t3 564 and t2 562. The STA 510 then calculates timing/fine timing measurements 580 to determine a timing measurement for a signal passing between the STA 510 and the AP 520 by subtracting t3 564 and t2 562 from the time difference between t1 560 and t4 566 and then dividing by 2. In other words, ToF=[(t4−t1)−(t3−t2)]/2. Thus, the 1st phase may be merged into the first part of the 2nd phase, wherein the messages of the negotiation phase 230 are used for timing measurement as well.

Accordingly, the fine timing measurement or fine timing measurement procedure in the embodiment described above, provides the ability to enable the STA 510 to include a set of conditions and parameters such that the AP 520 can evaluate the importance of honoring the fine time measurement request 530. An example of the set of parameters included in such a request might be, but is not limited to, the following:

- The number of relative distance or timing measurements to other APs already exists at the STA 510 side.
- Accuracy level used by the STA 510 for the timing/distance measurement.
- A measure of evaluating the LOS conditions 532 or group delay 542 acceptable by the STA 510 for timing or distance measurement.
- Request for time dependent resources allocation such as number of measurements, expected periodicity and/or duration of resource allocation.

The request may also include end conditions for the timing resource allocation, such as certain channel conditions appearing, which may indicate that the AP 510 is inadequate for timing measurement, accuracy level threshold. These conditions and additional information enables the AP 510 to better allocate its timing/fine-timing/distance measurement resources. An additional result may include an increase to the overall system capacity as to the number of simultaneously supported STAs and/or with higher location accuracy.

Figure 6:
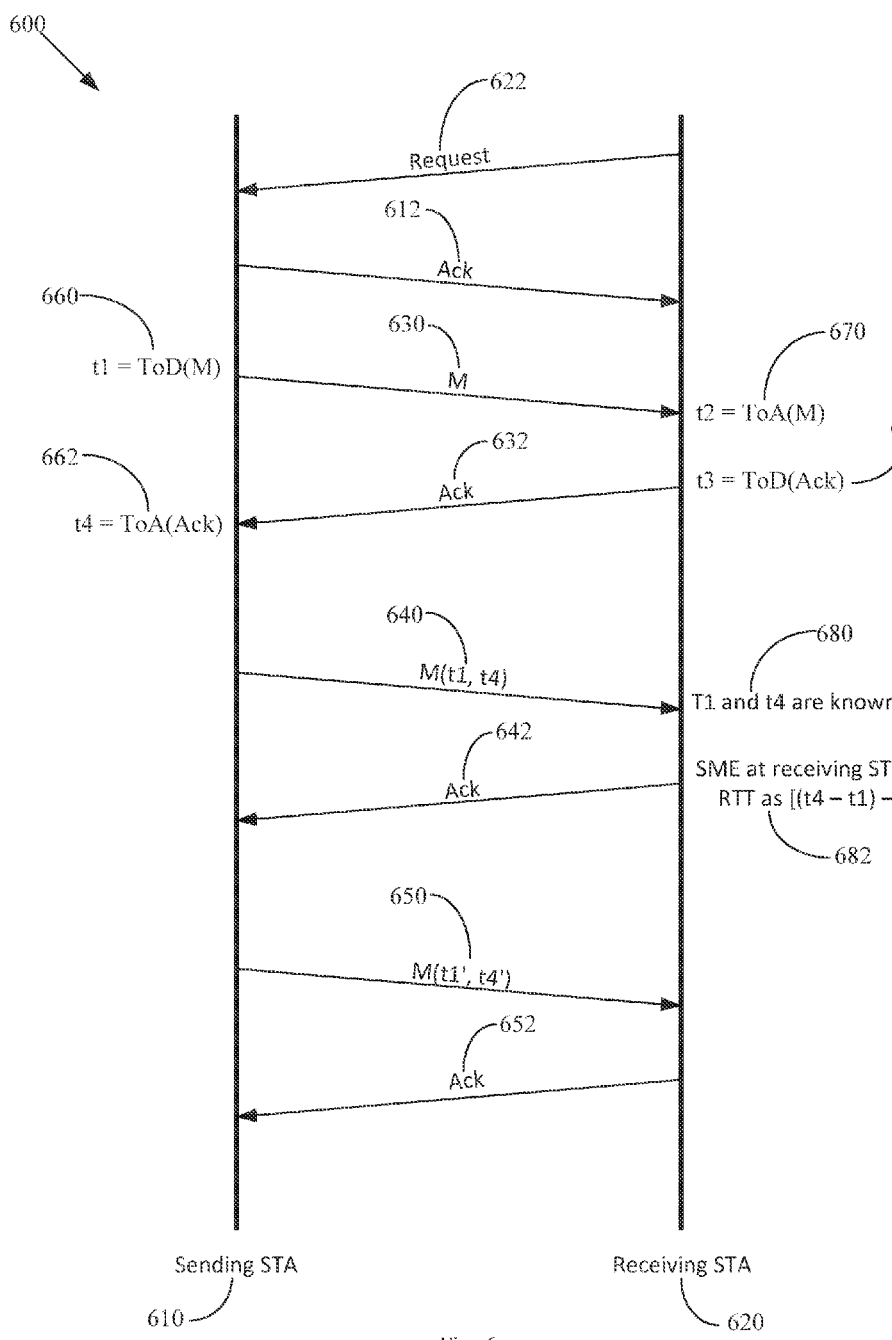
FIG. 6 illustrates a fine timing measurement procedure according to an embodiment.

FIG. 6 illustrates a fine timing measurement procedure 600, according to an embodiment. A sending STA 610, which supports the fine timing measurement procedure 600, may transmit fine timing measurement frames addressed to a receiving STA 620, which also supports the fine timing measurement procedure 600. Both the sending STA 610 and the peer receiving STA 620 may transmit using a single RF chain. The receiving STA 620 may send a fine timing measurement request message 622. The sending STA 610 may send an acknowledgement (Ack) 612 to the receiving STA 620.

In FIG. 6, the M messages 630, 640, 650 are the fine timing measurement frames/messages used to transfer measurement information of previous rounds (if one exists) and enable the parties to measure a time of departure (ToD) and a time of arrival (ToA). As shown in FIG. 6, the sending STA 610 transmits fine timing measurement frames 630, 640 in overlapping pairs. FIG. 6 shows fine timing measurement frame 650 repeating fine timing measurements t1', t4'. The first fine timing measurement frame 630 of a pair contains a nonzero dialog token (e.g., dialog token=n). The follow up fine timing measurement frame 640 contains a follow up dialog token set to the value of the dialog token in the first frame of the pair (e.g., dialog token=n). With the first fine timing measurement frame 630, both STAs 610, 620 capture timestamps. The sending STA 610 captures the time at which the fine timing measurement frame 630 is transmitted, (t1) 660. The receiving STA 620 captures the time at which the fine timing measurement frame arrives, (t2) 670 and the time at which the Ack response 632 is transmitted, (t3) 672. The sending STA 610 captures the time at which the Ack frame 632 arrives, (t4) 662.

In the follow up fine timing measurement frame 640, the sending STA 610 transfers the timestamp values it captured (i.e., t1 660 and t4 662) to the receiving STA 620. At this time, t1 and t4 are now known 680 at the receiving STA 620. A short messaging entity (SME) at the receiving STA 620 estimates the round-trip time (RTT) to be:

$$[(t4-t1)-(t3-t2)]682.$$

The receiving STA 620 sends an Ack frame 642 to the sending STA 610. The sending STA 610 may resend the follow up fine timing measurement frame 640 with the timestamp values it captured (i.e., t1 660 and t4 662). The receiving STA 620 may again send an Ack frame 652 to the sending STA 610.

Figure 7:
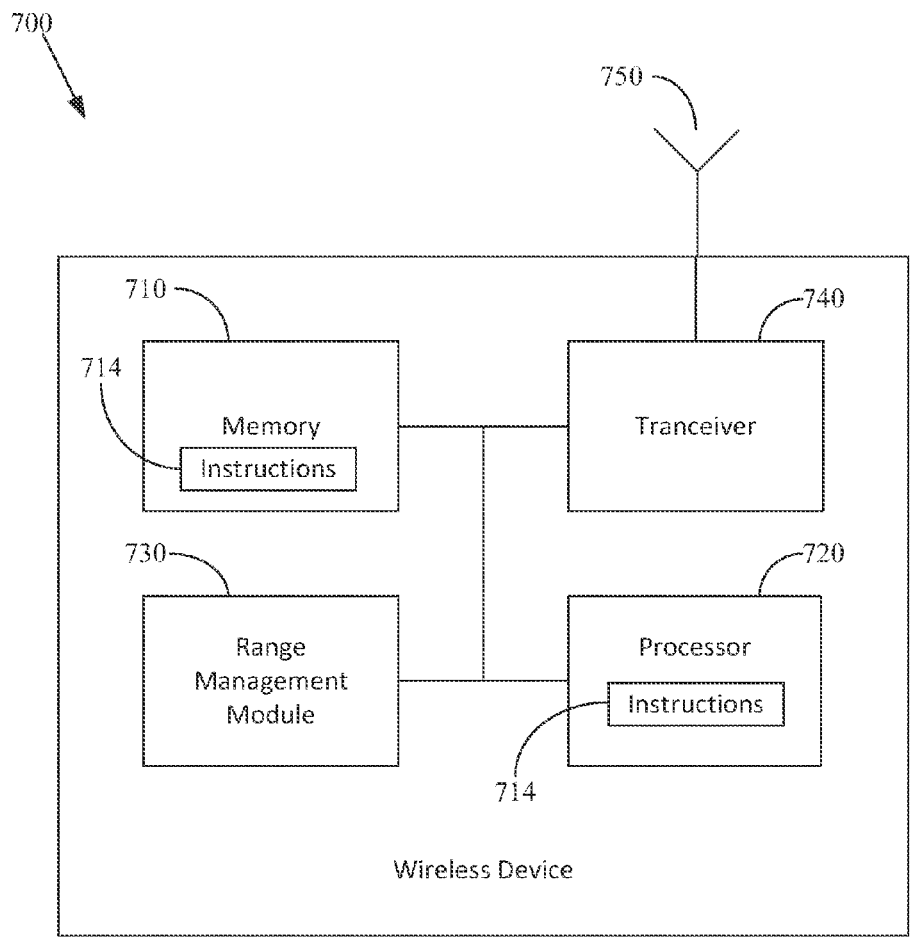
FIG. 7 is a block diagram of a wireless device according to an embodiment.

FIG. 7 is a block diagram of a wireless device 700 according to an embodiment. In FIG. 7, memory 710 is provided to store one or more sets of data structures or instructions 714 (e.g., software) embodying or utilized by any one or more of the techniques or functions described herein. The instructions 714 may also reside, completely or at least partially, within the processor 720 during execution thereof. A range management module 730 is provided for performing the initiator-conditioned fine timing measurement request, according to an embodiment. The ToF signals are transmitted and received through an antenna 750 and processed by a transceiver 740. The wireless device 700 may be a mobile station, an access point, or other device that may perform TOF exchanges, according to an embodiment.

Figure 8:
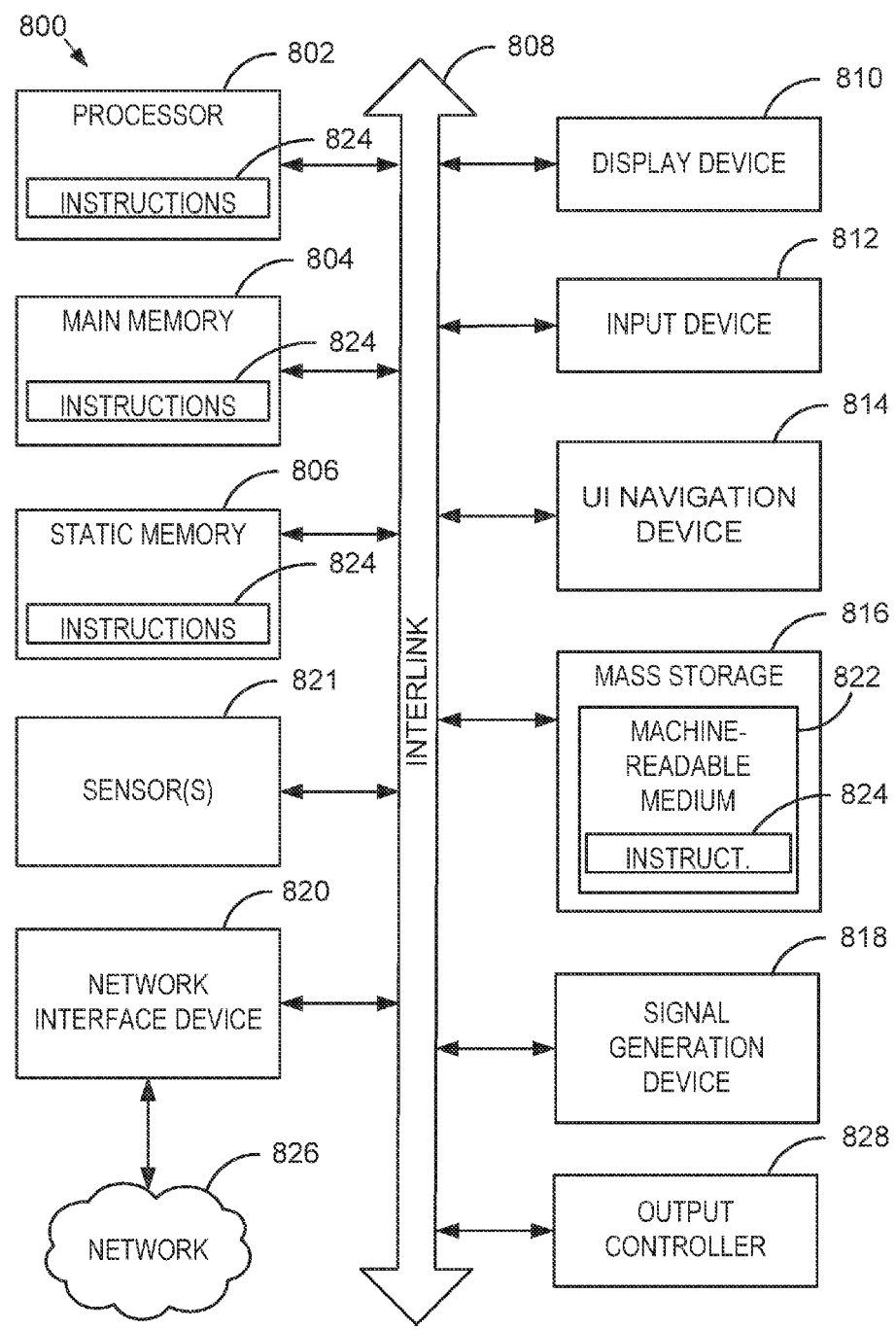
FIG. 8 illustrates a block diagram of an example machine upon which any one or more of the techniques (e.g., methodologies) discussed herein may performed.

FIG. 8 illustrates a block diagram of an example machine 800 upon which any one or more of the techniques (e.g., methodologies) discussed herein may be performed. In alternative embodiments, the machine 800 may operate in a standalone mode or may be connected (e.g., networked) to other machines in a network mode. In a networked deployment, the machine 800 may operate in the capacity of a server machine, a client machine, or both in server-client network environments. In an example, the machine 800 may act as a peer machine in peer-to-peer (P2P) (or other distributed) network environment.

The machine 800 may further be a personal computer (PC), a tablet PC, a set-top box (STB), a Personal Digital Assistant (PDA), a mobile telephone, a web appliance, a network router, switch or bridge, or any machine capable of executing instructions 824 (sequential or otherwise) that specify actions to be taken by that machine 800.

Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Examples as described herein may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, the modules may not be instantiated at any one moment in time. For example, where the modules include a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The mass storage 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, static memory 806, or within the processor 802 during execution thereof by the machine 800. In an example, one or any combination of the hardware processor 802, the main memory 804, the static memory 806, or the mass storage 816 may constitute machine-readable media.

While the machine-readable medium 822 is illustrated as a single medium, the term "machine readable medium" may include a single medium or multiple media (e.g., a centralized or distributed database, and/or associated caches and servers) that are configured to store the one or more instructions 824.

The term "machine readable medium" may include any medium that is capable of storing, encoding, or carrying instructions 824 for execution by the machine 800 and that cause the machine 800 to perform any one or more of the techniques of the present disclosure, or that is capable of storing, encoding or carrying data structures used by or associated with such instructions 824. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; compact disk-read only memory (CD-ROM) and digital versatile disk—read only memory (DVD-ROM) disks.

The instructions 824 may further be configured for transmission and reception over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks 826 may include a local area network (LAN), a wide area network (WAN), a packet data network (e.g., the Internet), mobile telephone networks (e.g., channel access methods including Code Division Multiple Access (CDMA). Time-division multiple access (TDMA), Frequency-division multiple access (FDMA), and Orthogonal Frequency Division Multiple Access (OFDMA); cellular networks such as Global System for Mobile Communications (GSM), Universal Mobile Telecommunications System (UMTS), CDMA 2000 1x* standards and Long Term Evolution (LTE)); Plain Old Telephone (POTS) networks; wireless data networks (e.g., Institute of Electrical and Electronics Engineers (IEEE) 802 family of standards including IEEE 802.11 standards (Wi-Fi)), IEEE 802.16 standards (WiMax®) and others); peer-to-peer (P2P) networks; or other protocols now known or later developed.

For example, the network interface device 820 may include one or more physical jacks (e.g., Ethernet, coaxial, or phone jacks) or one or more antennas to connect to the network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 824 for execution by the machine 800, and includes digital or analog communications signals or other intangible medium to facilitate communication of such software.

Additional Notes & Examples

Example 1 includes subject matter (such as a device, apparatus, client or system) for performing initiator-conditioned fine timing measurement service request, including a range management module arranged to initiate transmission of a fine timing measurement request message for determining a timing measurement to a responding device, wherein the fine timing measurement request message includes condition instructions provided therein, to receive timing measurement information in response to the transmission of the fine timing measurement request message, wherein the fine timing measurement information is received according to the condition instructions provided in the fine timing measurement request message, and to calculate a timing measurement based on timing of receiving the fine timing measurement information.

Example 2 may optionally include the subject matter of Example 1, wherein the range management module is further arranged to determine a time of departure to the responding device for the fine timing measurement request message, the range management module being further arranged to receive a fine timing measurement message from the responding device and to record a time of arrival of the fine timing measurement message from the responding device.

Example 3 may optionally include the subject matter of any one or more of Examples 1-2, wherein the range management module is further arranged to receive location information from the responding device and to calculate timing measurements of a signal passing to the responding device based on the received fine timing measurement information.

Example 4 may optionally include the subject matter of any one or more of Examples 1-3, wherein the fine timing measurement is determined by subtracting a difference between a time of arrival of the fine timing measurement request message and a time of departure of the fine timing measurement response message and a time of difference between the time of departure of the fine timing measurement request message and the time of arrival of the fine timing measurement response message to produce a result, and dividing the result by two.

Example 5 may optionally include the subject matter of any one or more of Examples 1-4, wherein the condition instruction includes trigger conditions for initiating a fine timing measurement request for the responding device to respond to the fine timing measurement request message message.

Example 6 may optionally include the subject matter of any one or more of Examples 1-5, wherein the condition instructions for a plurality of responding devices indicates a threshold for the service initiation given the channel conditions as measured by the receiving device of a broadcast fine timing measurement request message.

Example 7 may optionally include the subject matter of any one or more of Examples 1-6, wherein the fine timing measurement request is also used for fine timing measurement by measuring a time-of-departure (ToD) and a time-of-arrival (ToA) by both parties if the condition instructions included in the fine timing measurement request message are met.

Example 8 may optionally include the subject matter of any one or more of Examples 1-7, wherein the condition instructions include start conditions.

Example 9 may include subject matter (such as a method or means for performing acts) including transmitting, by an initiator, a fine timing measurement request message for establishing location service, receiving fine timing measurement information in response to the transmitting of the fine timing measurement request message and calculating a timing measurement based on the received fine timing measurement information.

Example 10 may optionally include the subject matter of Example 9 further including negotiating conditions prior to transmitting the fine timing measurement request message, wherein the fine timing measurement information is received according to the condition instructions.

Example 9-10 may optionally include the subject matter of Examples 9-10 further including providing condition instructions in the fine timing measurement request message, wherein the fine timing measurement information is received according to the condition instructions provided in the fine timing measurement request message.

Example 12 may optionally include the subject matter of Examples 9-11 further including determining a time of departure of the fine timing measurement request message, receiving a fine timing measurement request message and recording a time of arrival of the fine timing measurement request message from a responding device, wherein the calculating the fine timing measurement based on the received fine timing measurement information is determined by subtracting a difference between the time of arrival of the fine timing measurement request message and the time of departure of the fine timing measurement response message and a time of difference between the time of departure of the fine timing measurement request message and a time of arrival of the fine timing measurement response message to produce a result, and dividing the result by two.

Example 13 may optionally include the subject matter of Examples 9-12 further including receiving the fine timing measurement request message with the condition instructions, processing the received fine timing measurement request message with the condition instructions to estimate channel conditions and to compare the estimated channel conditions to the received fine timing measurement request instructions, sending a fine timing measurement response message when the estimated channel conditions comply with the channel conditions including an indication that the response is a unicast message from an identified responding device, recording a time of the arrival of the fine timing measurement request message, sending an acknowledgement by the responding device, subsequent to sending the acknowledgement, sending a timing measurement message including timing information and recording a time of departure from the responding device of the fine timing measurement message, wherein the calculation of a timing measurement based on received timing information further includes subtracting a difference between the time of arrival of the fine timing measurement request and the time of departure of the fine timing measurement response message and a time of difference between the time of departure of the fine timing measurement request message and a time of arrival of the fine timing measurement response message to produce a result, and dividing the result by two.

Example 14 may optionally include the subject matter of Examples 9-13, wherein the transmitting of fine timing measurement request message for the establishing of the location service includes condition instructions provided therein, the transmitting of fine timing measurement request message for the establishing of the location service further includes transmitting a fine timing measurement request message having condition instructions to provide an indication for evaluation of an importance of honoring the fine timing measurement request message.

Example 15 may optionally include the subject matter of Examples 9-14 further including providing timing measurements from a plurality of responding devices having predetermined channel conditions provided by the condition instructions in response to a broadcast request identified by the condition instructions.

Example 16 may optionally include the subject matter of Examples 9-15, wherein the transmitting the fine timing measurement request message for the establishing of the location service includes condition instructions provided therein, the transmitting the fine timing measurement request message further includes transmitting a fine timing measurement request message having condition instructions to provide parameters for indicating that a relative distance to other responding devices already exists at the initiator and how many other range measurement exists.

Example 17 may optionally include the subject matter of Examples 9-16, wherein the transmitting the fine timing measurement request message for the establishing of the location service includes condition instructions provided therein, the transmitting the fine timing measurement request message further includes providing parameters for indicating a level of priority of the initiator for establishing timing measurements.

Example 18 may optionally include the subject matter of Examples 9-17, wherein the transmitting a fine timing measurement request message for the establishing of the location service includes condition instructions provided therein, the transmitting the fine timing measurement request message further includes providing parameters for indicating an accuracy level for determining timing measurements and parameters for indicating a measure for evaluating line-of-sight conditions.

Example 19 may optionally include the subject matter of Examples 9-18, wherein the transmitting the fine timing measurement request message for the establishing of the location service including condition instructions provided therein further includes providing parameters for indicating that timing measurements to other responding devices already exists at the initiator and parameters for providing a request for time dependent resource allocation.

Example 20 may optionally include the subject matter of Examples 9-19, wherein the providing a request for time dependent resource allocation further includes providing a number of measurements, an expected periodicity, a duration for providing resources allocation and end conditions for the timing dependent resource allocation.

Example 21 may include subject matter (such as means for performing acts or machine readable medium including instructions that, when executed by the machine, cause the machine to perform acts) including transmitting, by an initiator, a timing measurement request message for establishing of location service including condition instructions provided therein, recording a time of departure of the fine timing measurement request message, receiving, according to the condition instructions provided in the fine timing measurement request message, a timing measurement response message providing ranging information including information associated with a response time of a responding device, recording a time of arrival of the fine timing measurement response message and calculating a timing measurement based on the received ranging information and the recorded time of departure of the fine timing measurement request message and the time of arrival of the fine timing measurement response message.

Example 22 may optionally include the subject matter of Example 21, wherein the operations further includes processing the received timing measurement request message with the condition instructions to estimate line-of-sight conditions and to compare the estimated line-of-sight conditions to the received timing measurement request message.

Example 23 may optionally include the subject matter of Examples 21-22, wherein the providing ranging information including information associated with a response time of the responding device further includes providing a time of arrival of the fine timing measurement response message and a time of departure of the fine timing measurement response message, and wherein the calculating a timing measurement further includes subtracting a difference between the time of arrival of the fine timing measurement request message and the time of departure of the fine timing measurement response message and a time of difference between the time of departure of the fine timing measurement request message and the time of arrival of the fine timing measurement response message to produce a result, and dividing the result by two.

Example 24 may optionally include the subject matter of Examples 21-23 further including providing timing measurements from a plurality of responding devices having a predetermined line-of-sight condition provided by the condition instructions in response to a broadcast request identified by the condition instructions.

Example 25 may optionally include the subject matter of Examples 21-24, wherein the transmitting the fine timing measurement request message for the establishing of the location service including condition instructions provided therein further includes transmitting a timing measurement request message having condition instructions to provide an indication for evaluation of an importance of honoring the fine timing measurement request message.

Example 26 may optionally include the subject matter of Examples 21-25, wherein the transmitting the fine timing measurement request message for the establishing of the location service including condition instructions provided therein further includes providing parameters for indicating a level of priority of the initiator for establishing timing measurements.

Example 27 includes subject matter (such as a device, apparatus, client or system) for performing initiator-conditioned fine timing measurement service request, including an antenna for transmitting and receiving signals and a range management module, coupled to the antenna, the range management module arranged to initiate transmission of a timing measurement request message for determining a timing measurement of a signal to a responding device, wherein the fine timing measurement request message includes condition instructions provided therein, to receive ranging information in response to the transmission of the fine timing measurement request message, wherein the ranging information is received according to the condition instructions provided in the fine timing measurement request message, and to calculate a timing measurement based on the received ranging information.

Example 28 may optionally include the subject matter of Example 27, wherein the condition instruction includes trigger conditions for setting conditions for the responding device to respond to the fine timing measurement request message.

Example 29 may optionally include the subject matter of Examples 27-28, wherein the condition instructions provide instructions for a plurality of responding devices having a predetermined line-of-sight condition provided by the condition instructions to provide timing measurements in response to a broadcast request.

Example 30 may optionally include the subject matter of Examples 26-29, wherein the range management module is further arranged to determine a time of departure to the responding device for the fine timing measurement request message, the range management module being further arranged to receive a timing measurement response message from the responding device and to record a time of arrival of the fine timing measurement response message from the responding device, wherein the fine timing measurement is determined by subtracting a difference between the time of arrival of the fine timing measurement request and the time of departure of the fine timing measurement response message from a difference between the time of departure of the fine timing measurement request message and the time of arrival of the fine timing measurement response message to produce a result, and dividing the result by two.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third." etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wireless device for performing initiator-conditioned fine timing measurement service request, the wireless device comprising:
   a range management module configured to:
   initiate transmission of a fine timing measurement request message for determining a timing measurement to a responding device, wherein the fine timing measurement request message includes condition instructions provided therein for the responding device to evaluate whether to respond to the fine timing measurement request message, wherein the condition instructions further provide parameters for indicating that a relative distance to other responding devices already exists at the initiator and how many other range measurements exist, receive timing measurement information in response to the transmission of the fine timing measurement request message, wherein the fine timing measurement information is received according to the condition instructions provided in the fine timing measurement request message, and calculate a timing measurement based on timing of receiving the fine timing measurement information.

2. The wireless device of claim 1, wherein the range management module is further configured to determine a time of departure to the responding device for the fine timing measurement request message, the range management module being further arranged to receive a fine timing measurement message from the responding device and to record a time of arrival of the fine timing measurement message from the responding device.

3. The wireless device of claim 2, wherein the range management module is further configured to receive location information from the responding device and to calculate timing measurements of a signal passing to the responding device based on the received fine timing measurement information.

4. The wireless device of claim 3, wherein the fine timing measurement is determined by subtracting a difference between a time of arrival of the fine timing measurement request message and a time of departure of the fine timing measurement response message and a difference between the time of departure of the fine timing measurement request message and the time of arrival of the fine timing measurement response message to produce a result, and dividing the result by two.

5. The wireless device of claim 1, wherein the condition instruction includes trigger conditions for initiating a fine timing measurement request for the responding device to respond to the fine timing measurement request message.

6. The wireless device of claim 1, wherein the condition instructions for a plurality of responding devices indicates a threshold for the service initiation given the channel conditions as measured by the receiving device of a broadcast fine timing measurement request message.

7. The wireless device of claim 1, wherein the fine timing measurement request is also used for fine timing measurement by measuring a time-of-departure (ToD) and a time-of-arrival (ToA) by both parties if the condition instructions included in the fine timing measurement request message are met.

8. The wireless device of claim 1, wherein the condition instructions include start conditions.

9. A method for performing initiator-conditioned fine timing measurement service request, comprising:
transmitting, by an initiator, a fine timing measurement request message for establishing location service, the fine timing measurement request message having condition instructions for a responder to evaluate whether to respond to the fine timing measurement request message;
receiving fine timing measurement information in response to the transmitting of the fine timing measurement request message; and
calculating a timing measurement based on the received fine timing measurement information, wherein the condition instructions further provide parameters for indicating that a relative distance to other responding devices ahead exists at the initiator and how man other range measurement exists.

10. The method of claim 9 further comprising negotiating conditions prior to transmitting the fine timing measurement request message, wherein the fine timing measurement information is received according to the negotiated conditions.

11. The method of claim 9, wherein the fine timing measurement information is received according to the condition instructions provided in the fine timing measurement request message.

12. The method of claim 9 further comprising:
determining a time of departure of the fine timing measurement request message;
receiving a fine timing measurement request message; and
recording a time of arrival of the fine timing measurement request message from a responding device;
wherein the calculating the fine timing measurement based on the received fine timing measurement information is determined by subtracting a difference between the time of arrival of the fine timing measurement request message and the time of departure of the fine timing measurement response message and a difference between the time of departure of the fine timing measurement request message and a time of arrival of the fine timing measurement response message to produce a result, and dividing the result by two.

13. The method of claim 9 further comprising:
receiving the fine timing measurement request message with the condition instructions;
processing the received fine timing measurement request message with the condition instructions to estimate channel conditions and to compare the estimated channel conditions to the received fine timing measurement request instructions;
sending a fine timing measurement response message when the estimated channel conditions comply with the channel conditions including an indication that the response is a unicast message from an identified responding device,
recording a time of the arrival of the fine timing measurement request message, sending an acknowledgement by the responding device;
subsequent to sending the acknowledgement, sending a timing measurement message including timing information; and
recording a time of departure from the responding device of the fine timing measurement message, wherein the calculation of a timing measurement based on received timing information further comprises subtracting a difference between the time of arrival of the fine timing measurement request and the time of departure of the fine timing measurement response message and a difference between the time of departure of the fine timing measurement request message and a time of arrival of the fine timing measurement response message to produce a result, and dividing the result by two.

14. The method of claim 9 further comprising providing timing measurements from a plurality of responding devices having predetermined channel conditions provided by the condition instructions in response to a broadcast request identified by the condition instructions.

15. The method of claim 9, wherein the condition instructions further comprise parameters for indicating a level of priority of the initiator for establishing timing measurements.

16. The method of claim 9, wherein the fine timing measurement request message further comprises parameters for indicating an accuracy level for determining timing measurements and parameters for indicating a measure for evaluating line-of-sight conditions.

17. The method of claim 9, wherein the fine timing measurement request message further comprises parameters for indicating that timing measurements to other responding devices already exists at the initiator and parameters for providing a request for time dependent resource allocation.

18. The method of claim 9, wherein the providing a request for time dependent resource allocation further includes providing a number of measurements, an expected periodicity, a duration for providing resources allocation and end conditions for the timing dependent resource allocation.

19. At least one non-transitory machine readable medium comprising instructions that, when executed by a machine, cause the machine to perform operations for performing initiator-conditioned fine timing measurement service request, the operations comprising:
    transmitting, by an initiator, a timing measurement request message for establishing of location service including condition instructions provided therein, the condition instructions for a responder to evaluate whether to respond to the fine timing measurement request message, wherein the condition instructions further provide parameters for indicating that a relative distance to other responding devices already exists at the initiator and how many other range measurement exists;
    recording a time of departure of the fine timing measurement request message;
    receiving, according to the condition instructions provided in the fine timing measurement request message, a timing measurement response message providing ranging information including information associated with a response time of a responding device;
    recording a time of arrival of the fine timing measurement response message; and
    calculating a timing measurement based on the received ranging information and the recorded time of departure of the fine timing measurement request message and the time of arrival of the fine timing measurement response message.

20. The at least one non-transitory machine readable medium of claim 19, wherein the operations further include processing the received timing measurement request message with the condition instructions to estimate line-of-sight conditions and to compare the estimated line-of-sight conditions to the received timing measurement request message.

21. The at least one computer non-transitory machine readable medium of claim 19, wherein the providing ranging information including information associated with a response time of the responding device further comprises providing a time of arrival of the fine timing measurement response message and a time of departure of the fine timing measurement response message, and wherein the calculating a timing measurement further comprises subtracting a difference between the time of arrival of the fine timing measurement request message and the time of departure of the fine timing measurement response message and a difference between the time of departure of the fine timing measurement request message and the time of arrival of the fine timing measurement response message to produce a result, and dividing the result by two.

22. The at least one computer non-transitory machine readable medium of claim 19 further comprising providing timing measurements from a plurality of responding devices having a predetermined line-of-sight condition provided by the condition instructions in response to a broadcast request identified by the condition instructions.

23. The at least one computer non-transitory machine readable medium of claim 19, wherein the transmitting the fine timing measurement request message for the establishing of the location service including condition instructions provided therein further comprises providing parameters for indicating a level of priority of the initiator for establishing timing measurements.

24. A system for performing initiator-conditioned fine timing measurement service request, the system comprising:
    an antenna for transmitting and receiving signals; and
    a range management module, coupled to the antenna, the range management module configured to initiate transmission of a timing measurement request message for determining a timing measurement of a signal to a responding device, wherein the fine timing measurement request message includes condition instructions provided therein, the condition instructions for the responding device to evaluate whether to respond to the fine timing measurement request message, to receive ranging information in response to the transmission of the fine timing measurement request message, wherein the ranging information is received according to the condition instructions provided in the fine timing measurement request message, and to calculate a timing measurement based on the received ranging information wherein the condition instructions further provide parameters for indicating that a relative distance to other responding devices already exists at the initiator and how many other range measurement exists.

25. The system of claim 24, wherein the condition instructions includes trigger conditions for setting conditions for the responding device to respond to the fine timing measurement request message.

26. The system of claim 24, wherein the condition instructions provide instructions for a plurality of responding devices having a predetermined line-of-sight condition provided by the condition instructions to provide timing measurements in response to a broadcast request.

27. The system of claim 24, wherein the range management module is further configured to determine a time of departure to the responding device for the fine timing measurement request message, the range management module being further arranged to receive a timing measurement response message from the responding device and to record a time of arrival of the fine timing measurement response message from the responding device, wherein the fine timing measurement is determined by subtracting a difference between the time of arrival of the fine timing measurement request and the time of departure of the fine timing measurement response message from a difference between the time of departure of the fine timing measurement request message and the time of arrival of the fine timing measurement response message to produce a result, and dividing the result by two.

* * * * *